Jan. 24, 1967  H. VONHOF  3,299,922
MACHINE AND METHOD FOR PRODUCING DECORATIVE WOOD SURFACES
Filed Dec. 18, 1964  3 Sheets-Sheet 1
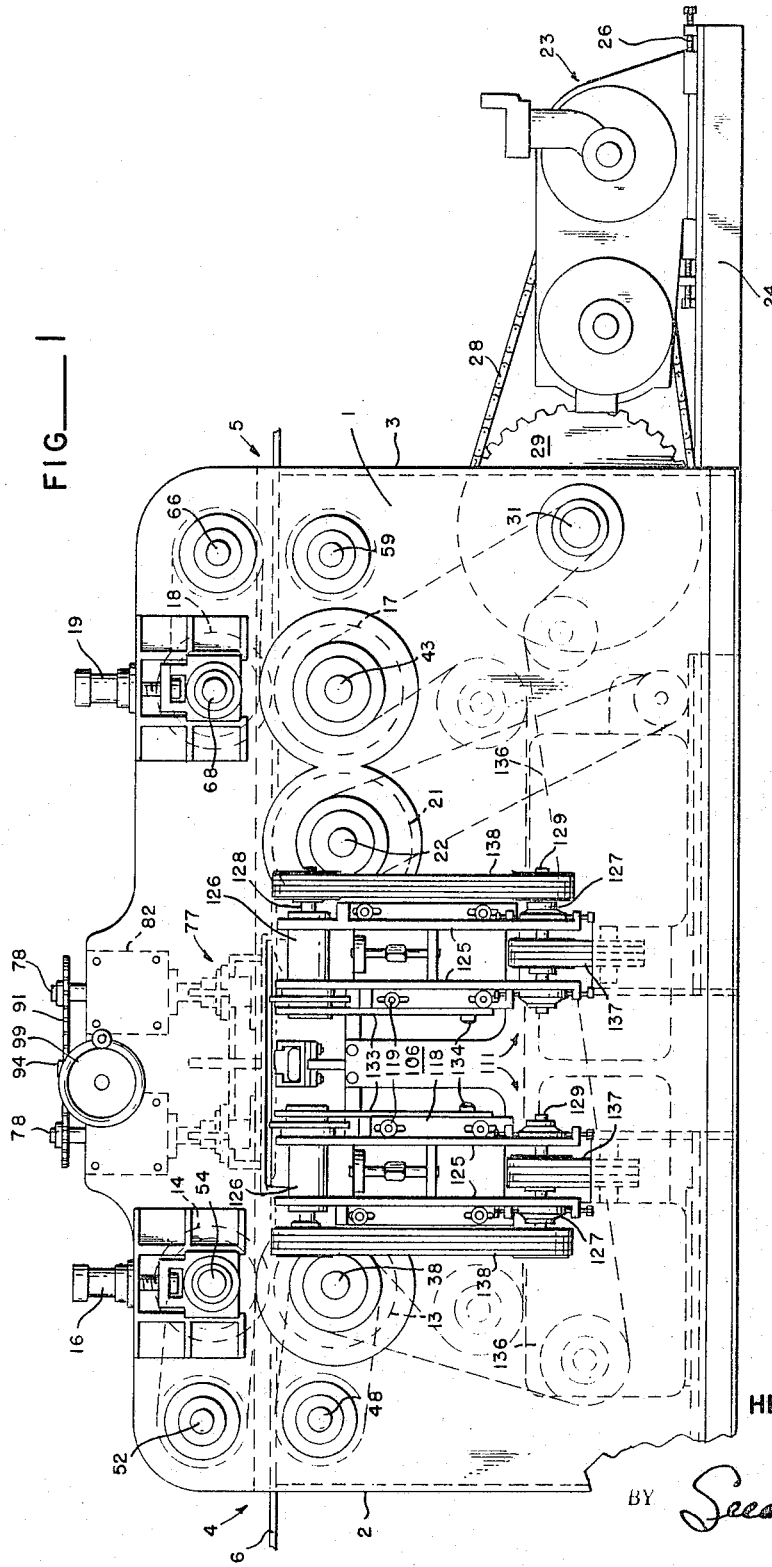
HERBERT VONHOF
INVENTOR.
BY Seed Berry
ATTORNEYS

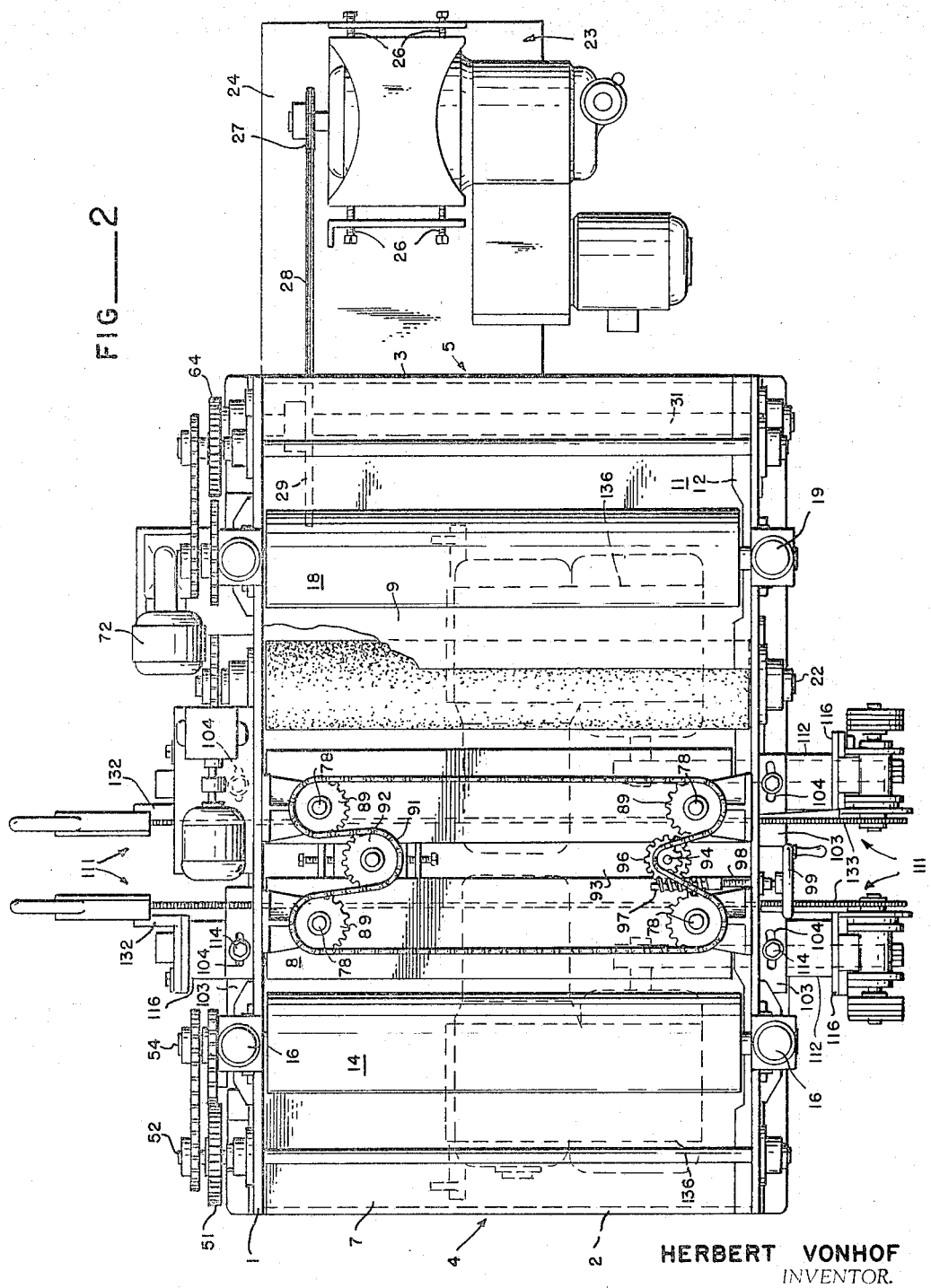

Jan. 24, 1967   H. VONHOF   3,299,922
MACHINE AND METHOD FOR PRODUCING DECORATIVE WOOD SURFACES
Filed Dec. 18, 1964   3 Sheets-Sheet 3
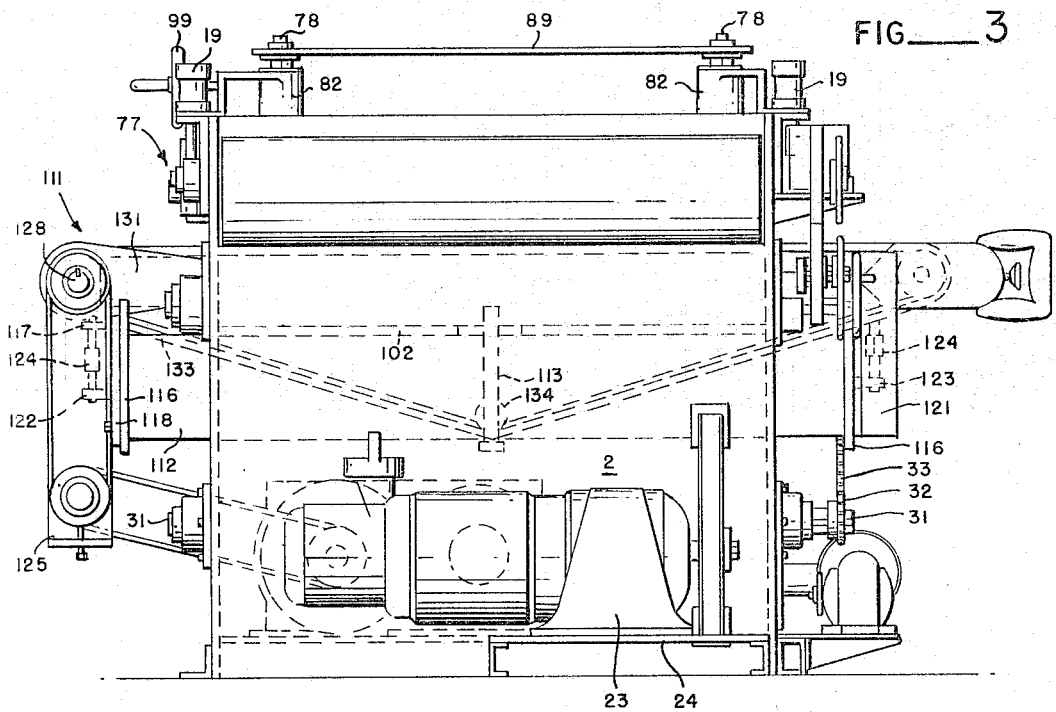
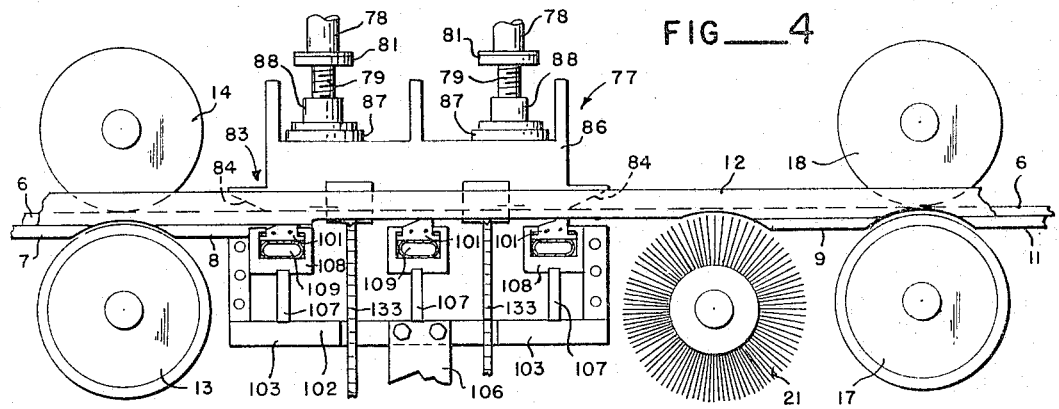
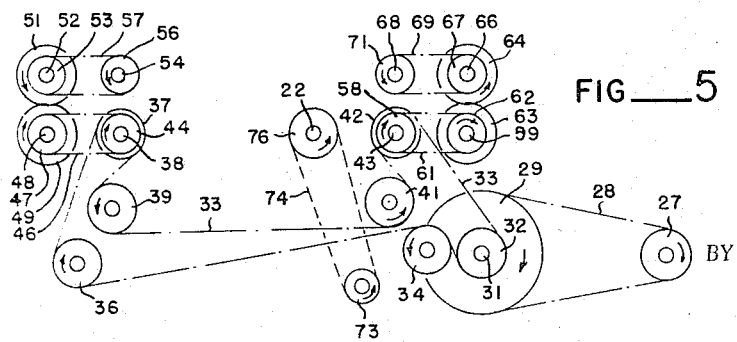
HERBERT VONHOF
INVENTOR.
BY
ATTORNEYS United States Patent Office 3,299,922
Patented Jan. 24, 1967

3,299,922
MACHINE AND METHOD FOR PRODUCING DECORATIVE WOOD SURFACES
Herbert Vonhof, Shelton, Wash., assignor to Simpson Timber Company, Seattle, Wash., a corporation of Washington
Filed Dec. 18, 1964, Ser. No. 419,303
10 Claims. (Cl. 144—326)

The present invention relates in general to wood surface finishing and more particularly to an improved method and machine for producing an aesthetically pleasing wood finish of the type possessed by what is known in the art as "re-sawn" lumber. Stated more precisely, the present invention deals with a method and machine for providing wood panels such as plywood panels with a rough texture of the type produced by the rough cuts of large band saws used in saw mills in the milling of lumber. The present invention is by no means limited to plywood panels but may be used for the surface finishing of a wide variety of panels, planks, lumber or the like.

Although the rough textured re-sawn appearance is normally produced as an intermediate step in the milling of conventional lumber, prior art devices have been developed for producing this effect on otherwise finished wood panels and the like. Among the known methods for producing the re-sawn appearance are those involving the use of specially constructed band saws and grinding belts or similar devices for scratching or roughening the surface of a panel. Many disadvantages of prior art methods and machines have been experienced in the nature of difficulty in obtaining thickness control of the finished panel, uniformity of surface texture, and speed and economy with which the panels may be produced.

The present invention seeks to alleviate the problems experienced by the prior art devices and to provide a much improved machine for producing a re-sawn appearance on wood surfaces by the use of chain saws in combination with means for accurately controlling the movement and positioning of the work piece as well as the chain saws. According to the present invention, a plurality of chain saws are mounted for operation in a plane at right angles to the plane of the work piece with means being provided to indepedently angularly position the saws in relation to the direction of travel of the work piece.

The primary object of the present invention is, therefore, to provide an improved machine for producing a decorative re-sawn surface which is less expensive to operate and which is capable of producing a consistently higher quality product at an increased rate.

Another object of the present invention is to provide an improved machine utilizing independently adjustable chain saws which operate in a plane at right angles to the plane of the work piece.

Another object of the present invention is to provide an improved means for controlling the positioning of the chain saws and the positioning and movement of the work piece.

Another object of the present invention is to provide an improved machine of the type described which includes means for obtaining positive thickness control in the finished panel.

Another object of the present invention is to provide a thickness control for finished panels of the character described which includes adjustably fixed backup means opposite a plurality of chain saws for positively controlling the finished thickness of panels passing between the backup means and the chain saws.

Yet another object of the present invention is to provide an improved machine of the type described wherein a plurality of chain saws are independently controlled for speed and positioning to enable the finished panel to be produced with one pass through the machine.

A further object of the present invention is to provide an improved method for producing a decorative re-sawn appearance on wood surfaces.

A still further object of the present invention is to provide an improved method for producing a decorative appearance on wood surfaces which method includes positive guiding of the moving panel over a plurality of chain saws to control the finished thickness of the panel.

The means by which the foregoing objects and other advantages which will be apparent to those skilled in the art are accomplished, are set forth in the following specification and allustrated in the accompanying drawings in which:

FIG. 1 is a side elevational view of the machine of the present invention;

FIG. 2 is a top plan view of the machine shown in FIG. 1;

FIG. 3 is an end elevation of the machine;

FIG. 4 is a partially schematic elevational detail showing the positioning of the chain saws and the backup means; and FIG. 5 is a schematic illustration of the drive means for the machine.

Referring now to the drawings wherein like reference numerals indicate identical parts in the various views, the preferred form of the invention comprises a machine frame having vertical side plates 1 and vertical end plates 2 and 3 which may be assembled by any desirable means such as by welding or bolting so as to provide a rigid frame structure. As seen in FIGS. 1 and 2, the left end of the machine constitutes the infeed end indicated generally at 4 and the right hand end of the machine, as seen in FIGS. 1 and 2, constitutes the outfeed end indicated generally at 5. Thus a panel such as the panel 6 passes through the machine from left to right as seen in FIGS. 1 and 2 from the infeed end 4 to the outfeed end 5.

Support for the panels moving into the infeed end of the machine is provided by a first infeed deck plate 7 and a second infeed deck plate 8 which may be seen most clearly in FIGS. 2 and 4. The deck plates 7 and 8 may be secured to the side plates 1 of the machine in any desirable fashion so as to provide a rigid vertical support for the moving panel. Likewise outfeed deck plates 9 and 11 extend between the side plates 1 at the outfeed end or portion 5 of the machine. One side of the machine is also provided with a straight edge 12 as shown in FIGS. 2 and 4 for guiding the panel as it advances through the machine.

Mounted between the side plates 1 at the infeed side of the machine is a fixed lower infeed roll 13 and a vertically adjustable upper infeed roll 14 mounted in vertical alignment. The rolls 13 and 14 may be pipe rolls and the lower infeed roll 13 is preferably rubber covered or otherwise provided with a suitable friction surface for advancing the panel through the machine. As indicated in FIGS. 1 and 2, the rolls 13 and 14 are suitably journaled in appropriate bearings mounted on the side plates 1. Proper pressure may be applied to the upper infeed roll 14 by any conventional means such as the air cylinders 16 as will be understood by those skilled in the art. The drive means for turning the rolls 13 and 14, as well as additional rolls to be described, will be fully explained in connection with FIG. 5 of the drawings.

Mounted between the side plates 1 at the outfeed end 5 of the machine is a fixed lower outfeed roll 17 and a vertically adjustable upper outfeed roll 18 with the rolls being in vertical alignment. The rolls 17 and 18, like the rolls 13 and 14, may be conventional pipe rolls and the lower outfeed roll 17 is preferably rubber covered or otherwise provided with a suitable friction surface for moving the panel through the machine. The rolls 17 and 18 are also suitably journaled in appropriate bearings mounted on the side plates 1 as clearly shown in FIGS. 1 and 2. A constant downward pressure is applied to the upper outfeed roll 18 by means of the air cylinders 19 in a conventional manner, as will be understood by those skilled in the art. The outfeed portion of the machine is also provided with a cylindrical brush 21 carried on the shaft 22 journaled for rotation in the side plates 1 as indicated in FIG. 1. As will be further explained in connection with the drive means for the various rolls and the brush, the brush is rotated in a counter-clockwise direction as viewed in FIGS. 1 and 4 so as to clean the bottom side of the advancing panel after it has been contacted by the chain saws. Referring now especially to FIG. 5, the drive means for the various feed rolls and the brush 21 will be described in detail. First, referring to FIGS. 1 and 2, a variable speed electric motor unit, indicated generally at 23, is mounted on a suitable base structure 24 and may be adjustably positioned by screw adjusting means 26 in a conventional manner for accurately positioning the drive motor. The drive motor 23 is provided with a drive sprocket 27 which is rotated in the clockwise direction as indicated schematically in FIG. 5. The sprocket 27 is used to drive the chain 28 for rotating a driven sprocket 29 fixed to the rotatable shaft 31 which is journaled for rotation between the side plates 1 as indicated. The shaft 31 is provided on one end with an additional sprocket 32 for driving the single chain 33 which, through the system of idler sprockets shown is used to finally drive the infeed rolls 13 and 14 and the outfeed rolls 17 and 18 as may be understood most clearly from FIGS. 1 and 5. As indicated in FIG. 5, the sprocket 32 will be rotated clockwise and the chain 33 passes over the idler sprocket 34 mounted on a stub shaft on the side of the machine and then over a second idler sprocket 36 mounted on a stub shaft on the opposite end of the machine. The chain 33 then trains about the sprocket 37 fixed to the shaft 38 at the lower infeed roll 13 to drive the roll in the clockwise direction as indicated in FIG. 5. From the sprocket 37, the chain 33 passes about a third idler sprocket 39 mounted on a stub shaft on the side of the machine at the infeed end and continues forwardly and about a fourth idler sprocket 41 also mounted on a stub shaft on the side of the machine at the forward or outfeed end of the machine. From the idler sprocket 41 the chain 33 passes about sprocket 42 carried on the outer end of the shaft 43 of the lower outfeed roll 17 serving to drive the roll in the clockwise direction as indicated in FIG. 5. The chain 33 continues from the sprocket 42 downwardly about the sprocket 32 on the shaft 31 thus providing a common drive for the lower infeed and outfeed rolls 13 and 17 respectively.

The drive for the upper infeed roll 14 is provided by means of sprocket 44 fixed to the shaft 38 which drives the chain 46 trained about the sprocket 47 mounted on idler shaft 48. The idler shaft 48 also carries a gear 49 in mesh with gear 51 carried by the idler shaft 52 which is provided with the sprocket 53. The sprocket 53 drives the shaft 54 of the upper infeed roll 14 by means of the sprocket 56 and the chain 57 to rotate the roll 14 in the counter-clockwise direction to advance the panel. In like manner, the shaft 43 of the lower outfeed roll 17 is provided with a sprocket 58 which drives the idler shaft 59 by means of the chain 61 and sprocket 62 fixed to the shaft 59 at the outfeed end of the machine. The shaft 59 has a gear 63 in mesh with gear 64 carried by a second idler shaft 66. The shaft 66 is provided with the sprocket 67 which provides a drive for the shaft 68 of the upper outfeed roll 18 by means of the chain 69 and sprocket 71. As illustrated, the shaft 68 and the upper outfeed roll 18 are driven in the counter-clockwise direction providing for movement of the panel out of the machine. It will be understood, of course, that many variations and modifications of the drive arrangement for the infeed and outfeed rolls may be provided without departing from the spiirt and scope of the present invention and the particular drive means illustrated by way of example only.

The brush 21 carried by the rotatable shaft 22 is driven by a separate motor 72 through the drive sprocket 73, chain 74 and sprocket 76 carried on the outer end of the shaft 22. As indicated in FIG. 5, the shaft 22 and the brush 21 are driven in the counter-clockwise direction, opposite to the direction of movement of the panel through the machine, so as to clean the under surface of the panel and may be regulated to the optimum speed of rotation for obtaining the desired results. With the structure thus far described, it may be appreciated that a panel 6 will be caused to move from the infeed end 4 of the machine by the action of the rolls 13 and 14 with its movement being continued by the outfeed rolls 17 and 18. The moving panel will be vertically supported on the bed plates 7, 8, 9 and 11, with its underside being contacted by the rotating brush 21 as it passes.

The hold-down unit indicated generally at 77 in FIGS. 1 and 4 of the drawings constitutes a backup means for the moving panel and serves to positively maintain the panel or work piece 6 in a fixed horizontal plane as the work piece passes between the infeed and outfeed rolls during the time when it is contacted by the chain saws, presently to be described. The hold-down device 77 also provides a positive backup means for the panel against the force applied to the panel by the chain saws in order to get an even cut of constant depth. As can be seen most clearly from FIG. 4, the hold-down device is located between the bed plates 8 and 9 and extends transversely between the two vertical side plates 1.

Turning now to the details of the hold-down device 77, four identical vertically disposed shafts 78 are provided, with two of the shafts being located in spaced relation on each side of the machine as illustrated clearly in FIG. 2. Each of the shafts 78 includes a screw threaded lower portion 79 and a thrust washer 81. Each of the shafts 78 is rotatably mounted in a bearing bracket 82 fixed to the side plates 1. The shafts 78 serve to adjustably support the backup shoe device 83 which is generally flat and rectangular having a bottom surface for contacting the upper face of the moving panel and bevelled longitudinal edges 84 to facilitate passing of the panel. It is preferable in practice to provide the backup shoe with a chrome finish or the like which is ground to provide a smooth surface to prevent marking of the top face of the work piece and to lessen the sliding friction between the work piece and the contact surface. Mounted on the upper surface of the shoe 83 is a support structure 86 which may be of varied configuration and serves the purpose of stiffening the backup shoe and provides a screw threaded connection between the shoe and the screw threaded ends 79 of the shafts 78 at opposite ends of the shoe. As shown in detail in FIG. 4, the support structure 86 is provided with screw nuts 87 through which the screw threaded portions 79 extend and are threadably engaged. Slack nuts 88 may also be provided on the screw threaded portions 79 as indicated. With this arrangement, it will be appreciated that the backup shoe 83 may be adjustably positioned and positively held in place to provide a stationary backup surface or hold-down for the work piece or panel. Each of the vertical shafts 78 is also provided with a sprocket 89 about which is trained a continuous chain 91. In addition, an adjustable, idler sprocket 92 is mounted on a cross member 93 for adjusting the tension in the chain and a drive sprocket and shaft 94 are mounted on the opposite end of the cross member 93 to drivingly engage the chain. The pinion and shaft 94 are rotated by means of the worm gear 96 carrier thereby which meshes with the worm 97 carried by the horizontal shaft 98. The shaft 98 is provided with a conventional hand wheel 99, whereby the sprocket 94 may be rotated to simultaneously rotate the shafts 78 to accurately and evenly position the hold-down shoe 84.

Referring to FIG. 4, three transversely extending and longitudinally spaced pressure shoes 101 are located beneath the backup shoe 83 and serve to hold the work piece tightly against the contact surface of the shoe 83 during the sawing operation. The shoes 101 are supported in a pressure shoe assembly which includes a transverse bottom plate 102 having extended end portions 103 which protrude beyond the sides of the plates 1 of the machine as indicated in FIG. 2. There are four such extended portions 103, two being located on each side of the machine and including an elongated slot 104 for a purpose to be described. The bottom plate 102 may be secured between the side plates of the machine by such means as the upstanding support member 106 on each side of the machine or any other suitable attaching means. The bottom plate 102 also includes three upstanding ribs 107, each of which supports a transverse channel member 108 for retaining the pressure shoes 101 as indicated most clearly in FIG. 4. Each of the pressure shoes 101 is backed up by an expandable pneumatic hose or the like 109 with the hoses 109 being pressurized from a common source in order to equalize the pressure applied to the shoes 101 as will be understood by those skilled in the art. It may also be mentioned that the pressure shoes 101 are preferably chrome finished in the same manner as described for the shoe 83. In this manner, the pressure shoes 101 may be applied to the bottom of the panels with any desirable force that is determined by the air pressure within the hoses 109.

The hold-down device 77 and the pressure shoes 101 thus positively maintain the work piece in a fixed plane as the panel moves between the feed rolls. Since the chain saws to be described remain stationary throughout any given operation, the hold-down device acts as a positive thickness control means for assuring a constant thickness in the finished panel. By turning the hand wheel 99, to raise or lower the backup shoe 83, the distance between the shoe and the chain saws may be varied to determine the depth of cut of the saw chain. This feature is extremely important when the panels are used in house construction or any other instance where rigid standards are set for materials.

Turning now to the details of the chain saw units indicated generally at 111 in the drawings, only one of the saw units 111 will be described in detail and it will be understood that the units are substantially identical in detail except for the positioning of the drive belts which allows the saw units to be mounted in close side-by-side relation as seen in FIG. 1. Each saw mounting assembly includes a transverse beam 112 which extends transversely completely through the machine and protrudes a substantial distance beyond each side plate 1 as illustrated most clearly in FIGS. 2 and 3. The beams 112 may be hollow tubular structures or the like and include a pivot bolt 113, shown in FIG. 3 which extends upwardly through the center of the beam and threadably engages the mid-portion of the bottom plate 102 of the pressure shoe assembly to provide a pivot point about which the beams are pivoted. Adjacent each end of each beam a clamp bolt 114 is provided and extends downwardly through the slots 104 in the extensions 103 of the plate 102 as shown in FIG. 2. With this arrangement, each of the beams 112 may be angularly positioned with respect to the longitudinal axis of the machine within the limits provided by the slots 104. The beams are, of course, clamped in the desired position during operation of the saws. Each end of each beam 112 is provided with a face plate 116 for mounting the saw bars and drive assemblies to be described. Each end plate 116 will also include an outwardly extending flange 117 adjacent the top edge thereof for a purpose to be described.

Drive mounting brackets 118 are fitted to the plates 116 at the left hand end of the beams 112 as viewed in FIG. 3 and are vertically adjustable with respect to the plates 116 by means of four bolts 119, shown in FIG. 1, which pass through vertical slots in the brackets and into the plates 116. Similar mounting brackets 121 are adjustably fixed to the opposite ends of the beams and secured by identical bolt and slot arrangements. The mounting brackets 118 and 121 also include outwardly extending flanges 122 and 123 respectively with an adjusting bolt 124 extending between the flanges of the respective end plates 116 and the flanges 122 and 123 on each of the mounting brackets 118 and 121. In this manner, the brackets may be vertically adjusted by means of the bolts 124 and then rigidly clamped in place. The brackets 118 also include vertical mounting members 125 for mounting upper bearing assemblies 126 and lower bearing assemblies 127. The bearing assembly 126 houses the chain saw drive shafts 128 and the lower bearing assemblies 127 provide a journal for the idler shafts 129. Conventional saw bars 131 extend from the drive shafts 128 and are mounted at their opposite ends to the brackets 132 carried by brackets 131 on the opposite ends of the beams 112. The drive sprockets and idler sprockets for driving the saw chains 133 are conventional in structure and will be understood by those in the saw chain art. As seen most clearly in FIG. 3, the saw chains 133 are guided in their upper horizontal run by the saw bars 131 with their lower runs being passed about suitable idler sprockets 134 mounted on the sides of the beams 112. It will be understood that any conventional type of slack tighteners, adjusting means and lubricating means may be provided for the saw chains as desired and as will be understood by those skilled in the art.

Each chain saw assembly 111 is driven by its own variable speed electric motor unit 136 by conventional V-belt drives 137 with the V-belt drives 138 serving to transfer the drive from the shafts 129 to the chain saw drive shafts 128.

As will be obvious from the structure described, the saw chains 113 may be individually adjusted vertically by the screw means 124 to control the depth of cut into the surface of the moving panel 6 and viewed in FIG. 4. In this manner, a predetermined cut can be made with the first saw chain encountered by the moving panel, with the second saw chain being utilized to provide the finished rough-sawn surface on the panel face. The backup shoe 83 will be set in position during the sawing operation so as to be in full contact with the moving panel with the constant force of the pressure shoes 101 positively holding the moving panel tightly against the backup shoe. The saw chains 133 thus contact the bottom surface of the moving panel while it is being held in a fixed plane providing an absolute and selectively variable thickness control for the finished panel moving out of the machine. As illustrated in the drawings, the teeth of the saw chains are caused to move transversely across the bottom surface of the panel being treated while the panel is moved through the device by the feed rolls in a direction transverse to the direction of movement of the saw teeth. Since the panel is in motion, it is necessary to adjust the angle of each of the saw chains a slight amount to accommodate for the movement of the panel. In this manner the saw lines in the finished texture of the panel surface are made perpendicular to the long axis of the panel. Independent angling of the saw chains is accomplished by pivoting the beams 112 about the pivot bolts 113 and then clamping the beams in position by the bolts 114. The amount of angle given to the chain saws will depend, of course, on the speed at which the panel is moved past the saw chains and the speed of the chain. For instance, if the panel moves a distance of two inches during the time it takes for any given tooth of the saw chains to traverse the panel, the saw chains must be angled so that the teeth contacting the opposite edges of the panel are spaced apart two inches in the direction of travel of the panel. Each chain saw may thus be independently set to correspond to the speed of the feed rolls. After the panel passes the saw chains, the reversely rotating brush 21 serves to clean the rough-sawn under surface of the panel.

Significant results are obtained by utilizing two independent chain saw units since the speed at which the panels can be worked is greatly increased. Since each saw chain takes only a portion of the total depth of cut, the load on the individual saw chains is reduced and the chains may be driven at a much higher speed than could a single saw making the total cut. Thus, in any given instance, regardless of the depth of cut required, only one pass of each panel through the machine is necessary, resulting in a saving of time and expense of production. Another important consideration is the quality of character of the texture imparted to the panel surface. The depth of cut per saw chain is limited by the characteristics of the material (such as various species of wood) being processed. Regardless of feed speed and saw chain speed there is a limit in cutting depth beyond which, due to tearing, slivering, and other effects, it is not possible to attain the desired finished texture with one saw chain. Since the saw chains may be individually angled and the drive speed of each saw chain independently controlled by the separate motor units 136, the depth and character of cut of each of the saw chains may be varied on any given panel. Other advantages arise from the versatility of the machine when working with panels having patched face veneers. For instance, with panels having protruding patches, which is the most common form of patching, the patched surfaces need not be sanded or finished prior to introduction into the machine since the first saw chains may be set to remove the protruding portions of the patches and to even the surface prior to the application of the second saw chain which produces the finished rough sawn surface. This aspect is important since the use of a single saw chain with a relatively deep cut results in tearing the patches from the face veneer, rendering the panel unacceptable in appearance.

The present invention provides a novel method for producing re-sawn surfaces on wood panels or the like by feeding the panels beneath a fixed backing member and providing a constant pressure means to hold the panel against the backing member while the teeth of the saw chains are moved across the under surface of the panel during its travel. In addition, the method involved also includes the positive control of the thickness of the finished panel by adjustment of the position of the backing member relative to the saw chains and the independent adjustability of the chain saw units. It will be readily apparent to those skilled in the art that the present invention provides novel and useful improvements in the apparatus and method for producing decorative wood surfaces. The arrangements and types of structural components utilized, and the present invention may be subject to numerous modifications well within the purview of this invention and applicant intends only to be limited to a liberal interpretation of the specification and appended claims.

What is claimed as new and novel and desired to be covered by Letters Patent is:

1. A wood surface finishing machine comprising in combustion: spaced infeed and outfeed support means, means for moving a flat work piece in a horizontal plane between said support means, an elongated adjustably mounted hold-down shoe fixed between said support means for contacting the top surface of a work piece moving between said support means, a plurality of spaced elongated pressure shoes positioned between said support means and directly beneath said hold-down shoe, said pressure shoes being mounted for vertical movement into contact with the bottom surface of said work piece, means for applying a constant pressure against each of said pressure shoes to hold the work piece firmly against said hold-down shoe, first and second chain saw units, each of said units being located between adjacent pressure shoes and disposed in a vertical plane, each of said chain saw units including a continuous saw chain having upper and lower runs, the teeth of each saw chain on said upper run contacting the bottom surface of said work piece and moving in a direction transverse to the direction of travel of said work piece, independent mounting structures for each chain saw unit including means for adjusting the saw chain vertically and means for pivoting the chain saw unit about a vertical axis, independent means for driving each saw chain, and a rotatable brush carried adjacent said outfeed support means for cleaning the bottom surface of said work piece.

2. The device according to claim 1 wherein said means for applying fluid pressure against said pressure shoes comprises; expansible hose members mounted beneath each of said pressure shoes, said hose members being fluid connected to each other and to a source of fluid pressure and providing support for said shoes, whereby said hose members may be expanded to exert pressure on said shoes.

3. A wood surface finishing machine comprising in combination: spaced support means, means for conveying a wood panel between said support means, positive hold-down means mounted between said support means for contacting the top surface of said panel, fluid pressure means for applying a constant pressure to the bottom surface of said panel at spaced points beneath said hold-down means, a plurality of chain saw units, each of said units being located between adjacent spaced points, each of said chain saw units including a saw chain having upper and lower runs, independent adjustable mounting means for supporting each of said chain saw units with the upper run of said chains in contact with the bottom surface of said panel with the direction of travel of said chains being transverse to the direction of travel of said panel, separate drive means carried by said machine for driving each of said chains, and means for adjusting the position of said hold-down means relative to said saw chains, whereby a portion only of the bottom surface of said panel is removed by each of said saw chains and the finished thickness of the panel may be positively controlled.

4. A wood surface finishing machine comprising in combination: spaced support means, means for conveying a wood panel between said support means for contacting one surface of said panel, fluid pressure means for applying a constant pressure to the other surface of said panel at spaced points opposite said backup means, a plurality of chain saw units located adjacent said spaced points, each of said chain saw units including a continuous saw chain, adjustable mounting means for supporting each of said chain saw units with one run of each chain in contact with said other surface of said panel with the direction of travel of said chains being transverse to the direction of travel of said panel, a drive means for driving each of said chains, and means for adjusting the position of said backup means relative to said saw chains, whereby a portion only of said other surface of said panel is removed by each saw chain and the finished thickness of the panel may be positively controlled.

5. A wood surface finishing machine comprising in combination: means for supporting and moving a wood panel in a given direction in a horizontal plane, positive hold-down means for contacting the top surface of said panel during travel, means for applying a constant pressure to the bottom surface of said panel at spaced points beneath said hold-down means, a plurality of chain saw units located adjacent said points, said chain saw units each having a saw chain with upper and lower runs, mounting means for supporting said chain saw units independently with the upper run of each chain in contact with the bottom surface of said panel, means for driving each of said chains in a direction of travel transverse to the direction of travel of said panel, and means for adjusting the position of said hold-down means relative to said saw chains, whereby a portion only of the bottom surface of the panel is removed by each chain and the finished thickness of the panel may be positively controlled.

6. A wood surface finishing machine comprising in combination: means for supporting and moving a wood panel in a given direction in a horizontal plane, fixed backup means for contacting one surface of said panel, means for applying a constant pressure to the other surface of said panel at spaced points opposite said backup means, a plurality of chain saw units located adjacent said points, each of said chain saw units including a continuous saw chain, mounting means for supporting said chain saw units independently with one run of each of said chains in contact with said other surface of said panel, means for driving each of said chains in a direction of travel transverse to the direction of travel of said panel, and means for adjusting said backup means relative to said saw chains, whereby a portion only of said other side of said panel is removed by each chain.

7. A wood surface finishing machine comprising in combination: means for supporting and moving a panel in a given plane, an adjustably fixed backup means in contact with one surface of said panel, means for holding said panel in contact with said backup means, and a plurality of spaced chain saw units having saw chains contacting the other side of said panel at right angles to said other surface, and independently adjustable mounting means for said chain saw units whereby the saw chain of each unit removes a portion only of said other side of the panel.

8. A method for producing a re-sawn wood surface comprising: passing a wood panel beneath a stationary surface, applying constant pressure to the bottom surface of the panel at spaced pressure points beneath said stationary surface during movement of the panel to constrain movement to a fixed horizontal plane, simultaneously contacting the bottom surface of the panel with a plurality of spaced saw chains located adjacent the pressure points and applied at right angles to the panel surface with the direction of travel of the saw chains being transverse to the direction of movement of the panel to remove a portion only of the bottom surface thereof, and independently adjusting said saw chains to selectively control the angle between the direction of travel of the chain and the direction of travel of the panel.

9. A method for producing a re-sawn wood surface comprising: moving a work piece in a horizontal plane, holding said work piece from displacement in an upward direction while applying a constant pressure against the bottom surface thereof during movement to constrain movement of the work piece in a fixed horizontal plane, contacting the bottom surface of the work piece with a plurality of spaced chain saws applied at right angles to the bottom surface and transversely to the direction of movement to remove a portion only of the bottom surface thereof, independently adjusting said saw chains to selectively control the angle between the direction of travel of the chain and the direction of travel of the panel and then brushing the bottom to remove loose material.

10. A method for producing a re-sawn wood surface comprising: passing a wood panel beneath a fixed member, applying pressure to the bottom surface of the panel, simultaneously contacting the bottom surface of the panel with a plurality of spaced saw chains applied at right angles to the panel and moving in a direction transverse to the direction of travel of the panel to remove a portion only of the bottom surface thereof, and independently adjusting said saw chains to selectively control the angle between the direction of travel of the chain and the direction of travel of the panel.

References Cited by the Examiner
UNITED STATES PATENTS

| | | | |
|---|---|---|---|
| 396,513 | 1/1889 | Saucier | 144—247 |
| 534,173 | 2/1895 | Pugh | 144—247 |
| 750,294 | 1/1904 | Matthiesen | 144—123 |
| 2,873,775 | 2/1959 | Abbott | 143—135 |

ANDREW R. JUHASZ, *Primary Examiner.*

WILLIAM W. DYER, Jr., R. J. ZLOTNIK,
*Assistant Examiners.*